(12) United States Patent
Suh (10) Patent No.: US 10,382,955 B2
(45) Date of Patent: *Aug. 13, 2019

(54) SECURITY METHOD AND SYSTEM FOR SUPPORTING PROSE GROUP COMMUNICATION OR PUBLIC SAFETY IN MOBILE COMMUNICATION

(71) Applicant: Samsung Electronics Co., Ltd, Gyeonggi-do (KR)

(72) Inventor: Kyungjoo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

This patent is subject to a terminal disclaimer.

(21) Appl. No.: 15/111,471

(22) PCT Filed: Jan. 13, 2015

(86) PCT No.: PCT/KR2015/000354
§ 371 (c)(1),
(2) Date: Jul. 13, 2016

(87) PCT Pub. No.: WO2015/105401
PCT Pub. Date: Jul. 16, 2015

(65) Prior Publication Data
US 2016/0337850 A1    Nov. 17, 2016

Related U.S. Application Data

(62) Division of application No. PCT/KR2015/000354, filed on Jan. 13, 2015.

(30) Foreign Application Priority Data

Jan. 13, 2014 (KR) .................. 10-2014-0004069
May 9, 2014 (KR) .................. 10-2014-0055885

(51) Int. Cl.
*H04L 29/06* (2006.01)
*H04W 12/06* (2009.01)
(Continued)

(52) U.S. Cl.
CPC .......... *H04W 12/06* (2013.01); *H04L 9/0822* (2013.01); *H04L 9/0833* (2013.01);
(Continued)

(58) Field of Classification Search
None
See application file for complete search history.

(56) References Cited

U.S. PATENT DOCUMENTS

2013/0288668 A1    10/2013 Pragada et al.
2013/0290696 A1*   10/2013 Broustis .......... H04L 9/08
                                              713/150
(Continued)

FOREIGN PATENT DOCUMENTS

KR    10-2013-0134821    12/2013
WO    WO 2013/089452 A1   6/2013
(Continued)

OTHER PUBLICATIONS

3GPP TR 23.703 V1.0.0 (Dec. 2013), 3GPP 3rd Generation Partnership Project; Technical Specification Group Services and System Aspects; Study on architecture enhancements to support Proximity-based Services (ProSe) (Release 12), 275 pages. (Year: 2013).*
(Continued)

*Primary Examiner* — Andrew J Steinle (57) ABSTRACT

A method for communicating by a terminal, includes transmitting, to an MME, an attach request message including a public safety indication and/or a group communication indication; receiving, from the MME, an attach accept message including at least one type of information from among a ProSe identifier, a ProSe group identifier, and a
(Continued)

ProSe group for performing a ProSe, ProSe-related functions of the terminal, and a proximity-related security key (ProSe key) The method further includes transmitting a ProSe registration request to a ProSe function server and receiving, from the ProSe function server, a ProSe registration response message pending authentication of the terminal.

14 Claims, 9 Drawing Sheets

(51) Int. Cl.
*H04W 4/08* (2009.01)
*H04L 9/08* (2006.01)
*H04W 12/04* (2009.01)
*H04W 76/11* (2018.01)
*H04W 8/00* (2009.01)
*H04W 8/04* (2009.01)
*H04W 4/90* (2018.01)
*H04W 4/80* (2018.01)
*H04W 76/14* (2018.01)

(52) U.S. Cl.
CPC ...... *H04L 63/0428* (2013.01); *H04L 63/0869* (2013.01); *H04L 63/0876* (2013.01); *H04L 63/0892* (2013.01); *H04W 4/08* (2013.01); *H04W 12/04* (2013.01); *H04W 76/11* (2018.02); *H04W 4/80* (2018.02); *H04W 4/90* (2018.02); *H04W 8/005* (2013.01); *H04W 8/04* (2013.01); *H04W 76/14* (2018.02)

(56) References Cited

U.S. PATENT DOCUMENTS

| | | |
|---|---|---|
| 2013/0294433 A1 | 11/2013 | Hsu et al. |
| 2014/0335791 A1 | 11/2014 | Kim et al. |
| 2015/0004984 A1 | 1/2015 | Kim et al. |
| 2015/0087233 A1 | 3/2015 | Kim et al. |

FOREIGN PATENT DOCUMENTS

| | | |
|---|---|---|
| WO | WO 2013/095001 A1 | 6/2013 |
| WO | WO 2013/109040 A1 | 7/2013 |

OTHER PUBLICATIONS

International Search Report dated Mar. 3, 2015 in connection with International Patent Application No. PCT/KR2015/000354, 7 pages.
Written Opinion of the International Searching Authority dated Mar. 3, 2015 in connection with International Patent Application No. PCT/KR2014/000354, 4 pages.
3GPP TR 23.703 V1.0.0 (Dec. 2013), 3GPP 3rd Generation Partnership Project; Technical Specification Group Services and System Aspects; Study on architecture enhancements to support Proximity-based Services (ProSe) (Release 12), 275 pages.
European Patent Office, "Supplementary European Search Report," Application No. 15735197, dated May 11, 2017, 7 pages.

\* cited by examiner

SECURITY METHOD AND SYSTEM FOR SUPPORTING PROSE GROUP COMMUNICATION OR PUBLIC SAFETY IN MOBILE COMMUNICATION

TECHNICAL FIELD

The present invention relates to systems for supporting communication functions between devices. More specifically, the present invention relates to proximity based service (ProSe) communication in a mobile communication network, i.e., ProSe discovery, ProSe communication, Device to Device (D2D) group communication, communication for public safety. This invention also relates to security systems related to D2D group communication, and D2D discovery for D2D group communication or D2D communication for public safety.

BACKGROUND ART

A Proximity based service (ProSe) supports group communication between devices in disaster situations, e.g., earthquake, tsunami, tornado, etc., where it is difficult to perform disaster rescue via existing infrastructure network communication, so that the devices can transmit the disaster situation information to each other, thereby ensuring public safety.

Despite such advantages, when proximity based services are not equipped with stability in terms of security, they may allow an entity with malicious intent to transmit incorrect information to users in a particular group. This may cause great confusion. Therefore, it is more important for proximity services to be equipped with security for public safety or group communication.

Although conventional communication systems have been configured to perform D2D communication via existing infrastructures, they have disadvantages, e.g., disclosure of security information related to user equipment (terminals), difficulty in operation, etc. Therefore, systems and schemes for setting or managing security for D2D group communication are required, while overcoming problems, such as security weakness, communication inefficiency, etc.

DISCLOSURE OF INVENTION

Technical Problem

The present invention has been made to address the above problems and disadvantages, and to provide at least the advantages described below. Accordingly, the present invention provides: a scheme capable of performing device-to-device (D2D) group communication in an evolved mobile communication system as well as a 3rd Generation Partnership Project Evolved Packet System (3GPP EPS); and a system for setting and controlling the security in D2D group communication.

An aspect of the present invention provides a scheme that enables devices which needs to perform D2D group communication to: obtain information required to perform D2D group communication and a security key required to perform D2D group communication; and set the security required to perform D2D group communication, so that the devices safely perform D2D group communication.

Another aspect of the present invention provides: a proximity based service (ProSe), i.e., ProSe discovery and ProSe communication, when performing D2D communication; a scheme for obtaining group communication related information that user equipment (UE) needs to perform group communication and setting the security for group communication; and a method and system for performing group communication, public safety communication, etc., safely, in terms of security.

Another aspect of the present invention provides a system that enables, in a state where UE discovers another UE in order to perform group communication but cannot inquire group related information, the UE: to generate and verify group related information and group security information; or to receive and verify inter-group security related information, so that the UE can safely perform group communication.

This section, technical problem, is merely intended to provide a few aspects of the present invention. It should be understood that the features and advantages of the present invention are not limited to those in the foregoing description, and the other features and advantages not described above will become more apparent from the following description.

Solution to Problem

In accordance with an aspect of the present invention, a communication method of a terminal is provided. The communication method includes: transmitting, to a Mobility Management Entity (MME), an attach request message containing a public safety indication and/or a group communication indication; receiving, from the MME, an attach accept message containing at least one of the following: a ProSe identity, a ProSe group identity, a ProSe group key, a ProSe related capability of the terminal, and a proximity related security key (ProSe key), to provide a proximity based service (Prose); transmitting a ProSe registration request message to a ProSe function server; and receiving a ProSe registration response message related to authentication of the terminal from the ProSe function server.

Preferably, the method further includes: transmitting, to a second terminal, a paging message containing a public safety indication and/or a group communication indication; transmitting, to the second terminal, a ProSe group communication request message containing ProSe group related information; receiving, when the second terminal verifies that the terminal belonged to a ProSe group using the ProSe group related information, a ProSe communication response message from the second terminal; verifying whether the second terminal belongs to the ProSe group; and performing ProSe group communication with the second terminal.

Preferably, performing ProSe group communication with the second terminal includes: transmitting a ProSe group session key request message to the ProSe function server; receiving a ProSe session key encrypted by the ProSe group key from the ProSe function server; transmitting a message requesting a ProSe group encryption key or integrity key to the ProSe function server; and receiving a ProSe group encryption key or integrity key, encrypted by the ProSe session key, from the ProSe function server.

Preferably, transmitting an attach request message includes: containing a secret value used to verify whether the terminal is suitable for group communication in the attach request message.

Preferably, verifying whether the second terminal belongs to the ProSe group includes: transmitting, to the ProSe function server, a verification request message inquiring whether the second terminal belongs to the ProSe group; and receiving, from the ProSe function server, a verification response message in response to the verification request message.

Preferably, the method further includes: transmitting, to the ProSe function server, a ProSe registration complete message containing the ProSe group key.

Preferably, verifying whether the second terminal belongs to the ProSe group includes: transmitting, to the second terminal, a message notifying that verification that the second terminal belongs to the ProSe group is successful.

In accordance with another aspect of the present invention, a terminal is provided. The terminal includes: a communication unit for communicating with entities; and a controller for: transmitting, to a Mobility Management Entity (MME), an attach request message containing a public safety indication and/or a group communication indication; receiving, from the MME, an attach accept message containing at least one of the following: a ProSe identity, a ProSe group identity, a ProSe group key, a ProSe related capability of the terminal, and a proximity related security key (ProSe key), to provide a proximity based service (Prose); transmitting a ProSe registration request message to a ProSe function server; and receiving a ProSe registration response message related to authentication of the terminal from the ProSe function server.

In accordance with another aspect of the present invention, a communication method of a proximity-based service (Prose) function server is provided. The communication method includes: performing ProSe registration for making a ProSe group communication with a terminal; receiving a message requesting a ProSe group session key from the terminal; generating the ProSe group session key; transmitting the ProSe session key encrypted by a ProSe group key to the terminal; receiving, from the terminal, a message requesting a ProSe group encryption key or integrity key; generating the ProSe group encryption key or integrity key; and transmitting the ProSe group encryption key or integrity key, encrypted by the ProSe group session key, to the terminal.

Preferably, the method further includes: receiving, from the terminal, a verification request message inquiring whether a second terminal belongs to the ProSe group; verifying a ProSe group communication list related to the terminal to determine whether the second terminal belongs to the ProSe group; and transmitting, to the terminal, a verification response message containing the verification result, in response to the verification request message.

Preferably, verifying a ProSe group communication list includes: generating a ProSe group key; and storing the ProSe group key.

In accordance with another aspect of the present invention, a proximity-based service (Prose) function server is provided. The Prose function server includes: a communication unit for communicating with entities; and a controller for: performing ProSe registration for making a ProSe group communication with a terminal; receiving a message requesting a ProSe group session key from the terminal; generating the ProSe group session key; transmitting the ProSe session key encrypted by a ProSe group key to the terminal; receiving, from the terminal, a message requesting a ProSe group encryption key or integrity key; generating the ProSe group encryption key or integrity key; and transmitting the ProSe group encryption key or integrity key, encrypted by the ProSe group session key, to the terminal.

Advantageous Effects of Invention

According to an embodiment of the present invention, devices performing communication are capable of setting the security for public safety via ProSe discovery, ProSe group communication, and ProSe communication.

According to an embodiment of the present invention, devices are capable of exchanging information with each other in the group in environments employing Evolved Universal Terrestrial Radio Access Network (EUTRAN), Universal Terrestrial Radio Access Network (UTRAN), GSM EDGE Radio Access Network (GERAN), etc. The devices are capable of receiving information related to a security key for ProSe discovery and ProSe communication from each other or performing a security procedure using the security key, thereby increasing the security and the efficiency in communication.

According to an embodiment of the present invention, in a state where UE discovers another UE in order to perform group communication but cannot inquire group related information, the UE is capable of: generating and verifying group related information and group security information: or receiving and verifying inter-group security related information, thereby safely performing group communication.

According to an embodiment of the present invention, in a situation where an infrastructure network is not available because of disasters, etc., the method and system is capable of transmitting important information via D2D communication. The method and system is capable of safely performing inter-group communication and communication for public safety.

It should be understood that the advantageous effects of the present invention are not limited to those in the foregoing description, and the other effects not described above will become more apparent from the following description.

MODE FOR THE INVENTION

Hereinafter, the operations and principle of the invention are described in detail with reference to the accompanying drawings. Detailed descriptions of well-known functions and structures incorporated herein may be omitted to avoid obscuring the subject matter of the invention. The following terms are defined considering functions related to the invention, and may be changed by users or operators according to their needs. Therefore, the terms will be defined throughout the contents of this description.

The invention is related to a scheme that enables various types of devices to transmit corresponding information to each other and perform a security procedure so that the devices serves as user equipment and discover each other, thereby safely performing inter-group communication in a mobile communication system environment.

In the following description, the invention is explained based on 3rd Generation Partnership Project based Evolved Packet System (3GPP-based EPS), Universal Terrestrial Radio Access Network (UTRAN), and GSM/EDGE Radio Access Network (GERAN). However, it should be understood that the present invention may also be applied to other types of mobile communication systems.

In order to perform D2D group communication, UE according to the invention is implemented in such a way as to receive D2D group communication-related information and security-related information and perform the security procedure. It should be understood that the embodiment may have various modifications therefrom without departing from the scope of the invention.

Figure 1:
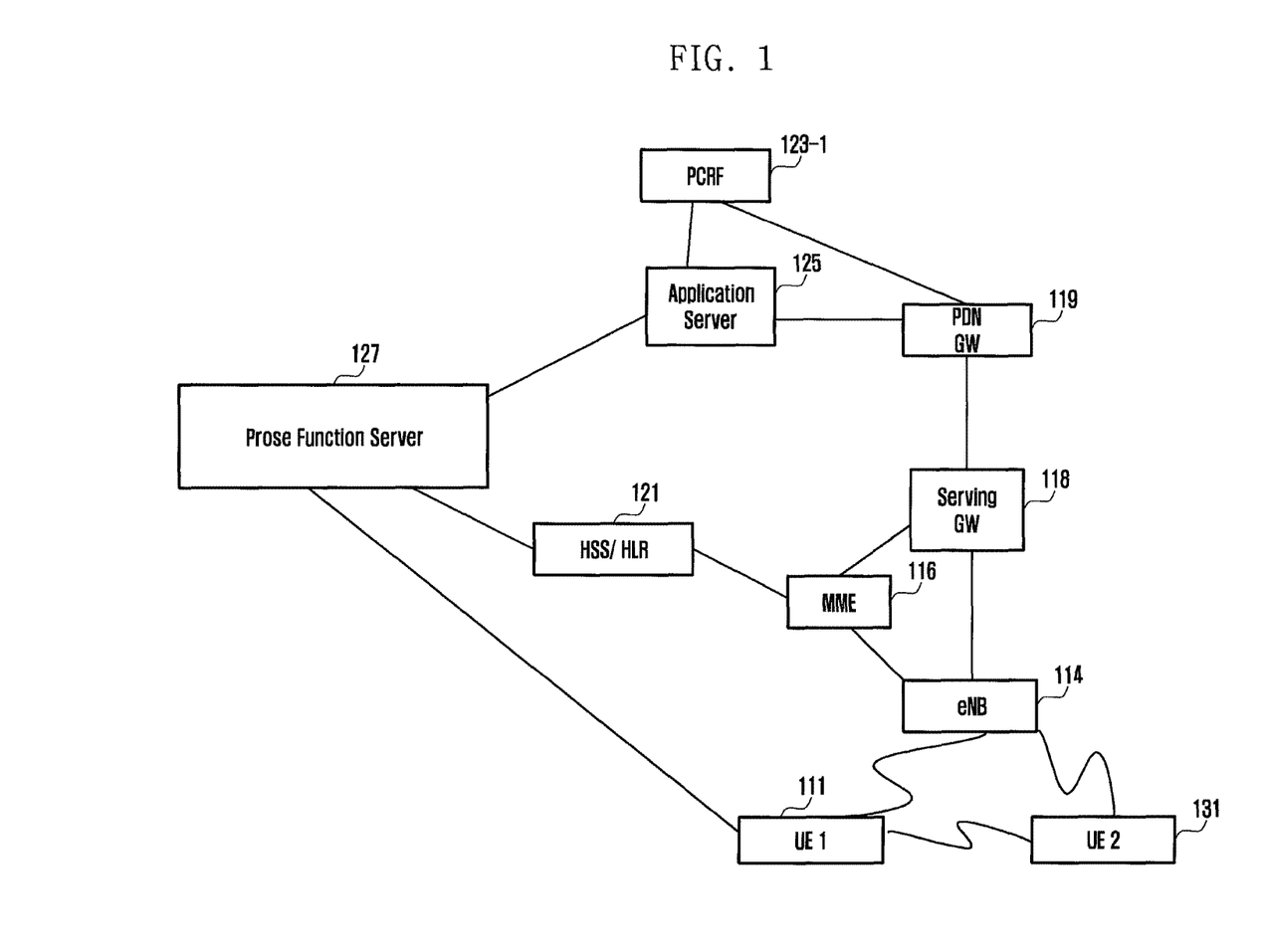
FIG. 1 is a diagram showing a mobile communication system according to an embodiment of the present invention.

An embodiment of the present invention as shown in FIG. 1 relates to a communication management method which manages communication as follows. When various types of devices including communication terminals (user equipment) prepare for D2D group communication in a EUTRAN or 3GPP environment, the devices transmit corresponding information to each other and perform a security procedure, thereby maintaining safe communication. It will be appreciated to those skilled in the art that the subject matter of the present invention can also be applied to various types of mobile communication systems which have the technical background, channel forms, network architectures, and protocols, similar to those of the present invention, and protocols that differ in type from those of the present invention but functions of which are similar to those of the present invention, without departing from the scope and sprit of the present invention.

FIG. 1 is a diagram showing a mobile communication system according to an embodiment of the present invention.

Referring to FIG. 1, the mobile communication system is capable of performing proximity based service (Prose) discovery, performing ProSe communication, and setting the security for group communication in ProSe communication. FIG. 1 shows architecture of a 3GPP EPS system as an example. The present invention is described based on EUTRAN; however, it should be understood that the present invention may also be applied to other mobile communication systems which are similar to EUTRAN.

Referring to FIG. 1, devices 111 and 131 may refer to various types of devices, e.g., conventional mobile communication terminals (user equipment or UE), devices configured to perform machine type communication, consumer devices, etc.

FIG. 1 shows an example of an environment according to the present invention where UE 1 and UE 2, indicated by reference numbers 111 and 131, respectively, perform ProSe discovery and ProSe group communication. UE 111 is capable of performing EUTRAN communication via evolved Node B (eNB) 114, Mobility Management Entity (MME) 116, etc. UE 111 is also capable of performing data communication via Serving Gateway (S-GW) 118, Packet Data Network Gateway (PDN-GW) 119, etc.

The mobile communication system is capable of further including a ProSe function server 127 for performing ProSe related functions in order to provide Prose functions. The ProSe function server 127 performs ProSe related registration, transmission of ProSe related information, verification of ProSe related capability of UE, ProSe related functions, etc. A Home Subscriber Server (HSS)/Home Location Register (HLR) 121 performs transmission of subscription information related to UE, security key information related to UE, etc. A ProSe application server 125 performs a Prose application server function. The ProSe application server 125 provides a ProSe related data service in order to perform a ProSe application function, cooperating with Policy and Charging Rules Function (PCRF) 123-1.

The foregoing description has provided the configuration of a mobile communication system according to an embodiment of the present invention.

The following description provides methods of performing authentication and setting security and communication in entities so that the entities can perform proximity based service (Prose), ProSe discovery, ProSe communication, and group communication, and a method of supporting operations of the entities, based on protocols used in mobile communication and Internet communication. The entities are devices or UE 111 and 131, eNB 114, MME 116, ProSe function server 127, HSS 121, application server 125, etc.

Figure 2A:
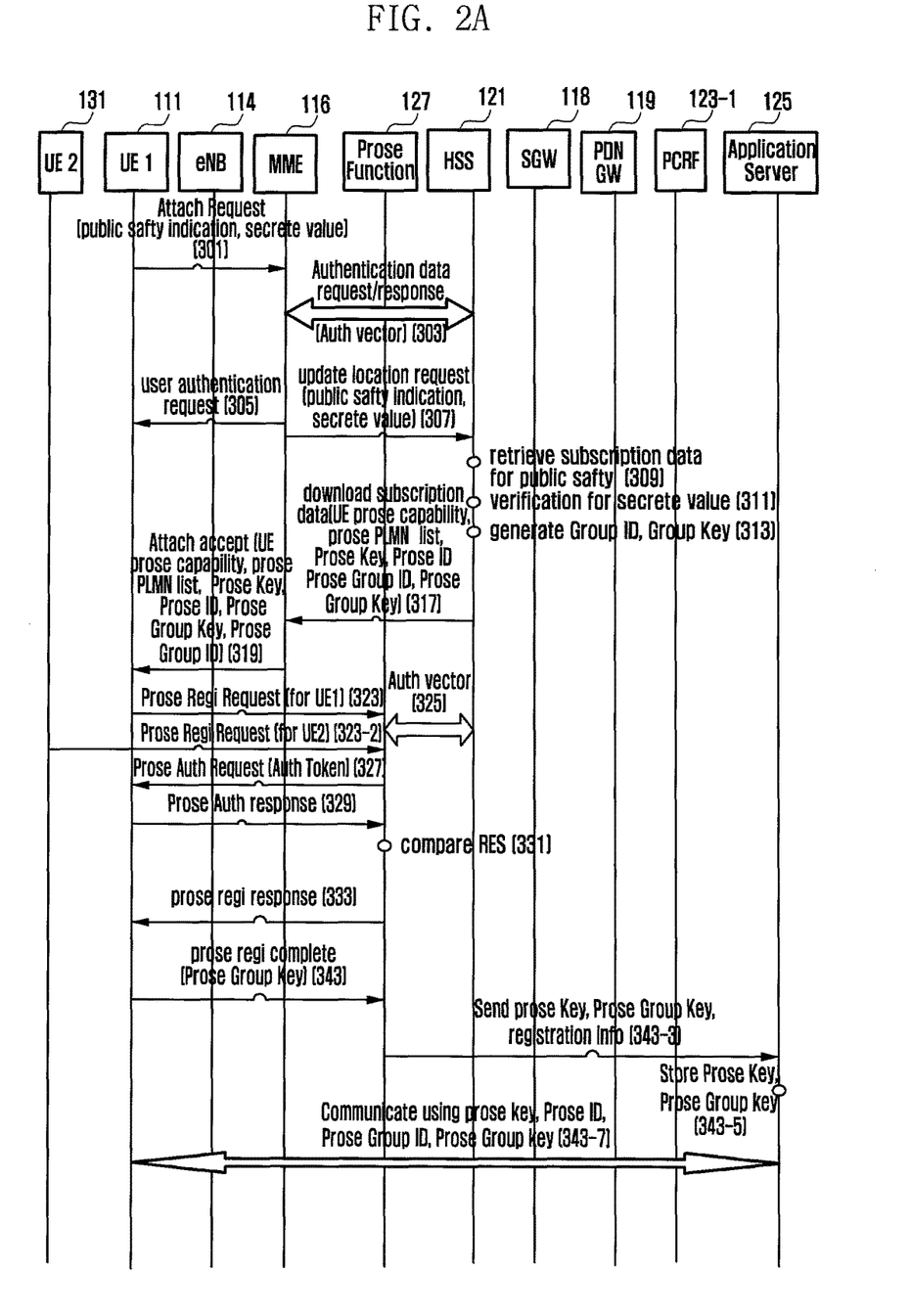
FIGS. 2a and 2b show a flow diagram that describes an embodiment of a communication and security procedure for security of ProSe group communication according to the present invention.
Figure 2B:
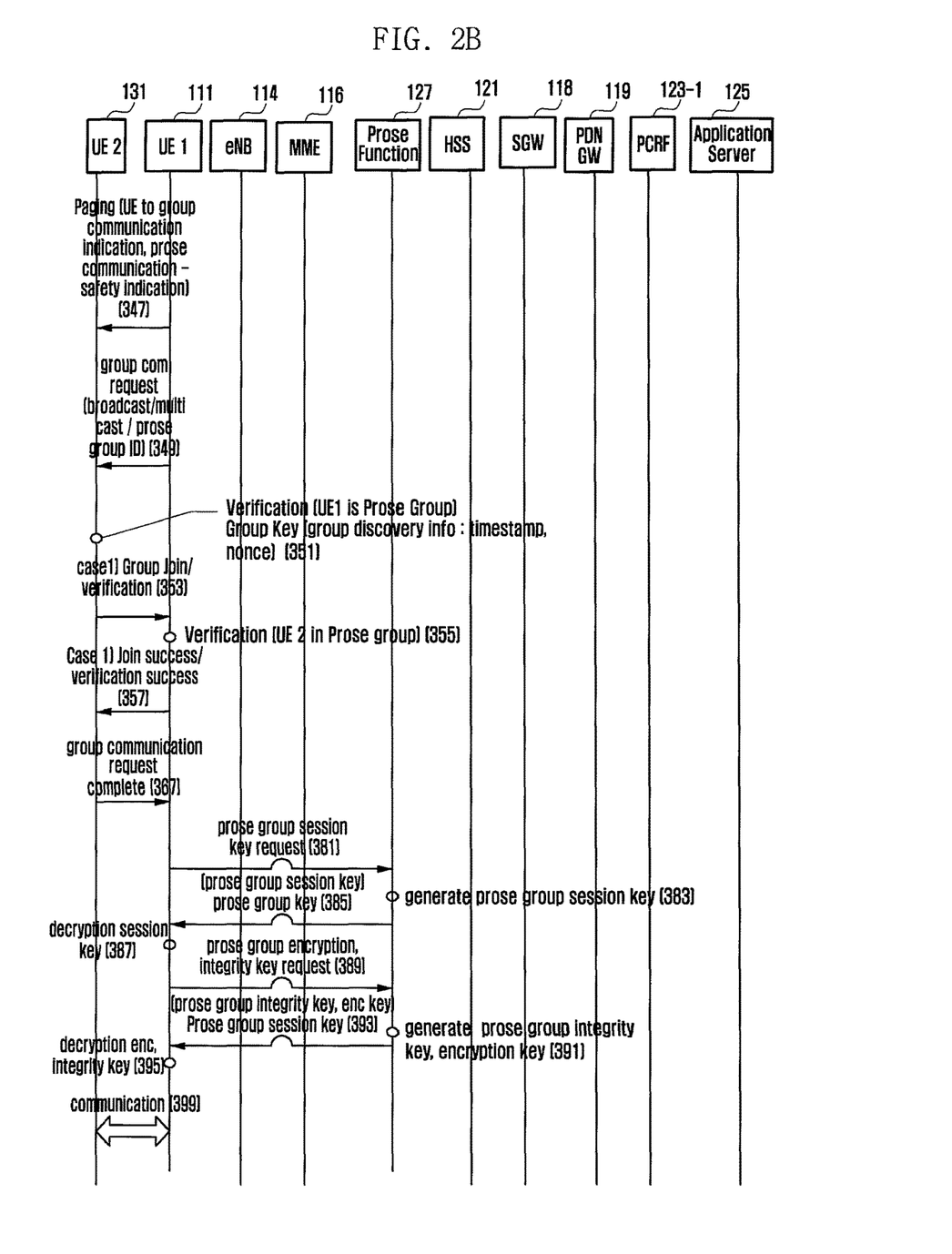

FIGS. 2a and 2b show a flow diagram that describes an embodiment of a communication and security procedure for security of ProSe group communication according to the present invention. In the embodiment, the flow diagram shows that group ProSe discovery and ProSe communication are performed via the entities.

Referring to FIGS. 2a and 2b, UE 1, indicated by the reference number 111, is capable of transferring an attach request message to eNB 114 and performs a registration procedure in operation 301. The eNB 114 is capable of transferring the received attach request message to an MME 116. When communication for public safety needs to be performed, the attach request message may contain a public safety indication for commanding communication for public safety. Alternatively, when group communication needs to be performed, the attach request message may contain a group communication indication for commanding group communication. When UE 1 first attaches to a network to perform public safety communication or group communication, it needs to be verified in the network whether it is suitable for performing public safety communication or group communication. To this end, the UE1 needs to attach to the network with a secure value for the verification. The secure value needs to be a value that can be used for verification in the network in order to perform group communication or public safety communication.

The MME 116 is capable of transferring an authentication data request message to HSS 121 in operation 303. The HSS 121 is capable of transferring, to the MME 116, a response message containing security-related information, such as an authentication vector, etc.

When the MME 116 transfers, to UE 1, a user authentication request message containing an authentication token, AUTN, the UE 1 is capable of transferring, to the MME 116, a user authentication response message along with a response secure value (RES) in operation 305.

The MME 116 is capable of transferring an update location request message to the HSS 121 in operation 307. When communication for public safety needs to be performed, the MME 116 contains a public safety indication in the update location request message and transfers the message to the HSS 121. Alternatively, when group communication needs to be performed, the MME 116 contains a group communication indication in the update location request message and transfers the message to the HSS 121. When the UE 1 first attaches to a network, it needs to be verified in the network whether it is suitable for performing public safety communication or group communication. To this end, the UE1 needs to attach to the network with a secure value for the verification.

The secure value needs to be a value that can be used for verification in the network in order to perform group communication or public safety communication.

The HSS 121 inquires information regarding the UE 1, such as an identity (ID) for group communication, a group key, etc. in operation 309.

When the HSS 121 does not obtain the inquired information in operation 309, it verifies whether the UE 1 is suitable for performing public safety communication or group communication, using the secret value (secure value) transferred from the UE 1, in operation 311.

When the HSS 121 ascertains that the UE 1 is suitable for performing public safety communication or group communication in operation 311, it assigns a group identity to the UE 1 and creates or assigns a group key to the UE 1 in operation 313. In an embodiment, a group identity is configured as follows. A group identity contains one of the following pieces of information regarding: a country, an area, and a communication network (service provider's network and intra-network). For public safety communication, the group identity may further contain public safety categories, e.g., fire service, public security, earthquake, typhoon, tsunami, tornado, etc.

The HSS 121 transfers subscription data to the MME 116 in operation 317. In order to provide ProSe, the HSS 121 may further transfer, to the MME 116, a ProSe identity, a ProSe group identity, a ProSe group key, a ProSe related capacity of UE, a proximity-related security key (ProSe key) if there are a registered ProSe identity and a security key, a ProSe Public Land Mobile Network (PLMN) list, etc. The proximity-related security key refers to a security key for proximity discovery or proximity communication. When the HSS 121 has had registration information regarding a proximity-related security key, it inquires the registration information and notifies the MME 116 of the information. On the other hand, when the HSS 121 has not had registration information regarding a proximity-related security key, it performs authentication and then generates the security key.

The MME 116 transfers an attach accept message to the eNB 114, and the eNB 114 transfers the received attach accept message to the UE 1 in operation 319. In operation 319, the MME 116 may also transfer, to the UE 1, the parameters which are transferred from the HSS 121 in operation 317, such as the ProSe identity, the ProSe related capacity of UE, the proximity-related security key, the ProSe group key, the ProSe group identity, the ProSe PLMN list, etc., along with the attach accept message.

In operations 301, 303, 305, 307, 309, 311, 313, 317, and 319, the MME 116 serves as an intermediate entity, or an intermediate node, and transfers a ProSe public indication, a secret value, etc., related to ProSe, to the HSS 121, so that the MME 116 participates in verification in the HSS 121. However, in another embodiment, an immediate node is not implemented with the MME 116 but the Prose function 127 participating in the intermediate processes, and transfers the parameters to the HSS 121 so that the MME 116 participates in verification of the HSS 121. That is, in operations 301, 303, 305, 307, 309, 311, 313, 317, and 319, an entity participating in the transmission of parameters may be the ProSe function 127. At least one of the following parameters for public safety: secret value, public safety indication, etc. may be transferred from the UE via the Prose function 127. The HSS 121 performs verification using the received parameters in operations 309, 311, and 313. When the ProSe function 127 serves as an entity in the intermediate processes, a Prose Group ID, a Prose Group Key, a Prose key, a Prose ID, etc., may be transferred from the HSS 121 to the UE via the Prose function 127 in operations 317 and 319.

After that, UE 1 transfers a ProSe registration request message to the ProSe function 127 in operation 323. Like the UE 1, UE 2, indicated by the reference number 131, performs a process for requesting ProSe registration in operation 323-2. The processes following operation 323-2 are described, referring to those of UE 1, assuming that UE 2 performs the same registration process as UE 1.

The ProSe function 127 transfers a ProSe registration request message to the HSS 121, and then the HSS 121 transfers a ProSe authentication vector to the ProSe function 127 in operation 325. The ProSe authentication vector contains a Cipher Key (CK) and an Integrity Key (IK).

The ProSe function 127 transfers, to the UE 1, a ProSe authentication token via a ProSe authentication request message in operation 327.

In another embodiment, the ProSe function 127 may transfer a Prose function ID, etc., to the HSS 121 in operation 325. In this case, the HSS 121 also transfers, to the Prose function 127, at least one of the following parameters: a ProSe group key, a ProSe key, a ProSe authentication token, etc. while transferring the ProSe authentication vector and the authentication token, in operation 325. The ProSe function 127 transfers, to the UE, at least one of the received parameters in operation 327.

UE 1 transfers, to the ProSe function 127, a ProSe authentication response message containing a value responding to the authentication token that the ProSe function 127 transferred to the UE 1 in order to perform ProSe registration in operation 329.

The ProSe function 127 compares RES with XRES and performs verification in operation 331.

The ProSe function 127 transfers a ProSe registration response message to the UE 1 in operation 333.

After that, UE performs ProSe group communication using a ProSe key or Prose identity, a Prose Group Key, a Prose Group ID, etc., as follows.

When UE 1 needs to verify a request message for ProSe group communication, using a group key, it contains its ProSe group key in a ProSe registration complete message and transfers the message to the ProSe function 127 in operation 343. The ProSe function 127 registers the group key of the UE 1 therein, using the received information.

The ProSe function 127 transfers, to an application server 125, at least one of the following: a ProSe key; ProSe registration-related information when UE performs registration procedure to the ProSe function 127; a Prose Group key; etc. in operation 343-3. The application server 125 stores at least one of the following: ProSe key, ProSe Group Key, etc. therein in operation 343-5. After that, the UE 1 and the application server 125 communicate with each other, using the ProSe key, ProSe identity, Prose Group ID, Prose Group key, etc. in operation 343-7.

Referring to FIG. 2b, the UE 1 transfers a paging message to the UE 2 in operation 347. The paging message may contain a group communication indication for commanding ProSe group communication in UE or a public safety communication indication for commanding communication for public safety in UE.

The UE 1 notifies the UE 2 that it needs to communicate with a ProSe group, and requests ProSe communication in operation 349. The ProSe communication request may be performed via broadcast, broadcast IP, multicast, multicast IP, etc. In this case, a ProSe group ID may be used to indicate a destination.

In order to prevent a replay attack, group related information regarding UE 1 is transferred along with: a time stamp (case 1), a nonce (case 2), or stamp and nonce which are concatenated with each other (case 3) in operation 349. The time stamp may employ: time of an application layer (case 4), time of a physical layer (case 5), i.e., a physical counter used in a physical layer, time used in system information block (SIB) 16 used in layer 2 (case 6), etc. Time obtained from a physical layer as in case 5 or 6 may be transferred via SIB of layer 2 as in case 6. The time information as in cases 5 and 6 is advantageous because there is less possibility of physical time delay. This information is transferred via one time hash function (case 7). This information is used to generate a Message Authentication Code (MAC) using keys shared by a transmitter and a receiver, e.g., a group key, etc., and authentication is performed as to whether it is transferred from the correct transmitter (case 8).

UE 2 decrypts group-related information, time stamp, nonce, etc., transferred in operation 349, using a ProSe group key, and then verifies whether UE 1 belongs to a Prose Group in operation 351.

UE 2 transfers a group communication response message to the UE 1 in operation 353. In another embodiment, transferring the group communication response message may also include a group join process. This process may not be required when operation 349 is performed via a broadcast method.

When UE 1 broadcasts or multicasts to members of the ProSe group and receives a response message from UE 2, the UE 1 is capable of verifying whether UE 2 belongs to the group (case 1). Alternatively, in another embodiment, UE 1 requests a network to verify whether UE 2 belongs to the group and receives the verification result from the network (case 2). The embodiment shown in FIGS. 2*a* and 2*b* relates to case 1 where UE 1 verifies whether UE 2 belongs to the group.

In case 1, as an example, where verification regarding group communication is performed at the level of UE, the UE 1 verifies whether UE 2 belongs to the Prose group in operation 355. UE 1 transfers, to the UE 2, a message containing information indicating that UE 2 has successfully joined the group in operation 357. Alternatively, in another embodiment, UE 1 verifies whether UE 2 belongs to the ProSe group and transfers, to the UE 2, a message informing of the verification success in operation 357. On the other hand, operation 357 may not be optionally performed when it is a process for informing that UE has successfully joined the multi-cast group, instead of informing the result of verifying whether UE belongs to the ProSe group.

UE 2 transfers, to the UE 1, a ProSe group communication request complete message in operation 367.

A session key for Prose Group communication, an encryption key, a decryption key, etc. are transferred as in the following operations 381 to 395.

UE 1 transfers, to the ProSe function 127, a message requesting a session key for Prose group communication (or a ProSe group communication session key request message) in operation 381.

The ProSe function 127 generates a ProSe group communication session key in operation 383.

The ProSe function 127 encrypts the ProSe group session key with a ProSe group key and transfers the encrypted key to the UE 1 in operation 385.

The UE 1 decrypts the ProSe group session key in operation 387.

The UE 1 transfers, to the ProSe function 127, a message requesting a security key, e.g., a ProSe group encryption message and an integrity key request message, in operation 389.

The ProSe function 127 generates a ProSe group communication integrity key and a ProSe group communication encryption key in operation 391.

The ProSe function 127 encrypts the ProSe group communication encryption key or the ProSe group communication integrity key with the ProSe group session key and transfers the encrypted result to the UE 1 in operation 393.

The UE 1 decrypts the ProSe group communication encryption key or the ProSe group communication integrity key with the ProSe group session key in operation 395.

After that, UE devices that belonged to the ProSe group, e.g., UE 1, UE 2, etc., safely perform Prose Group communication with each other in operation 399.

Figure 3A:
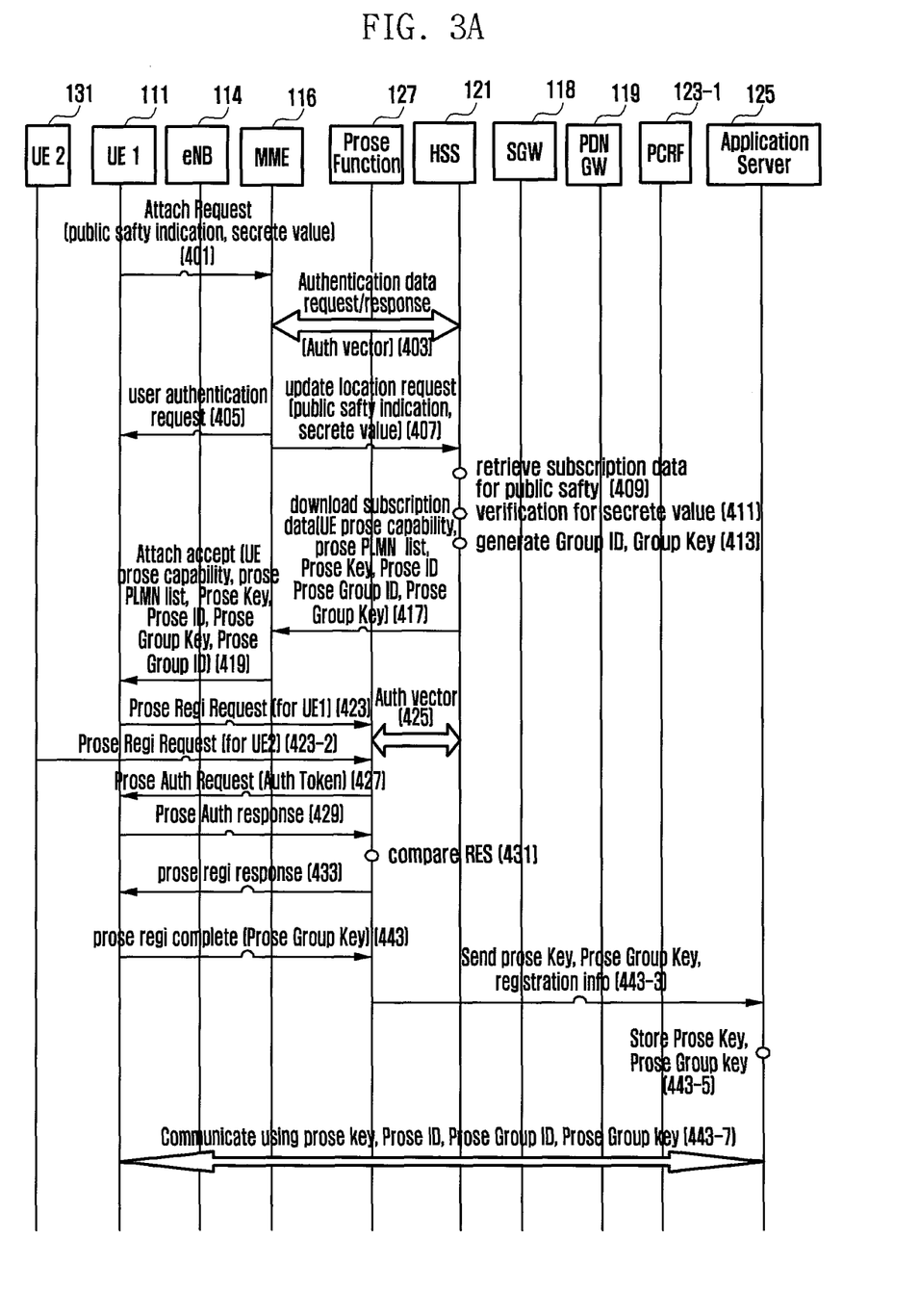
FIGS. 3a and 3b show a flow diagram that describes another embodiment of a communication and security procedure for security of ProSe group communication according to the present invention.
Figure 3B:
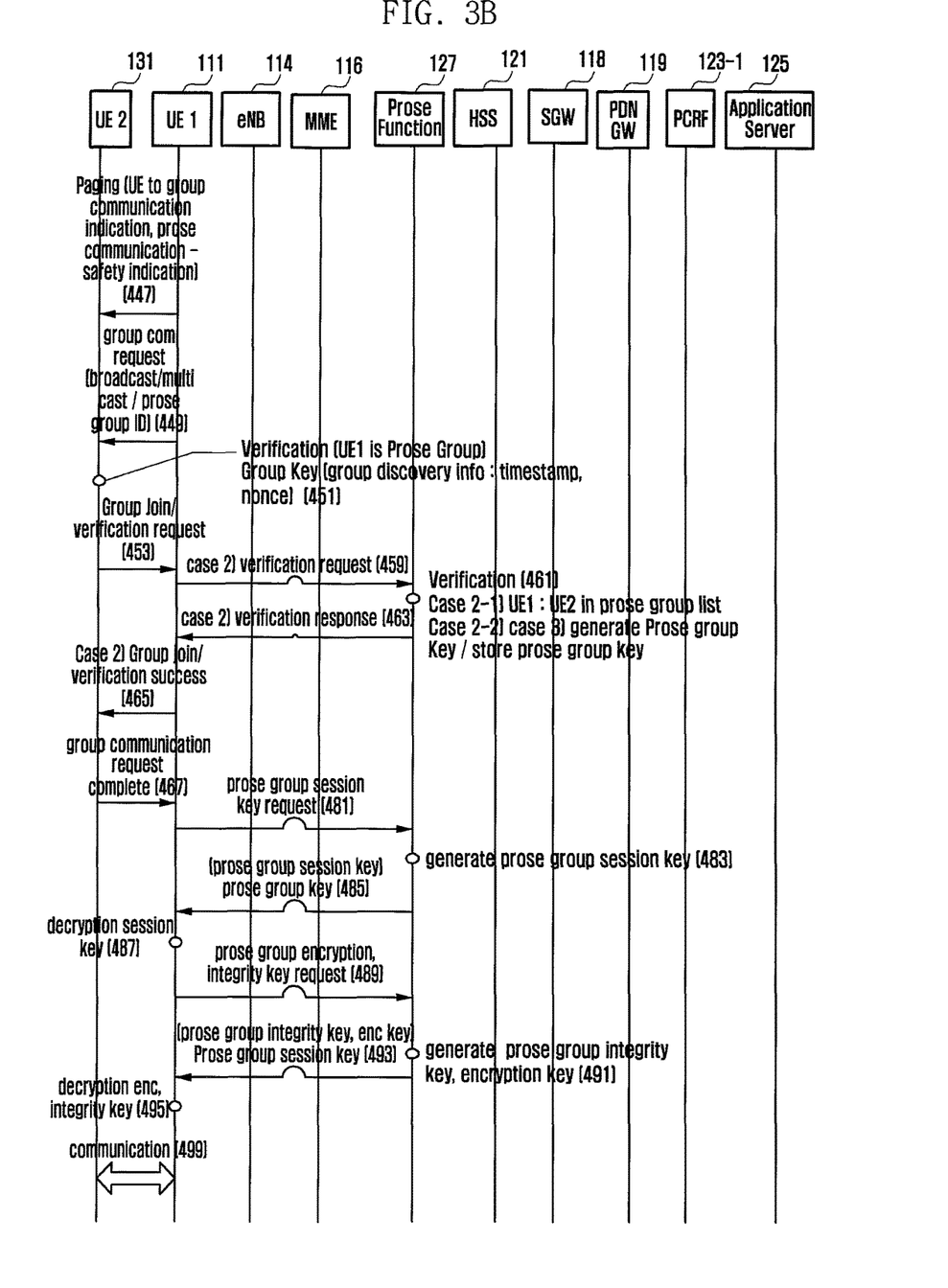

FIGS. 3*a* and 3*b* show a flow diagram that describes another embodiment of a communication and security procedure for security of ProSe group communication according to the present invention. In the embodiment, the flow diagram shows that group ProSe discovery and ProSe communication are performed via the entities.

Referring to FIGS. 3*a* and 3*b*, UE 1, indicated by the reference number 111, is capable of transferring an attach request message to eNB 114 and performs a registration procedure in operation 401. The eNB 114 is capable of transferring the received attach request message to an MME 116. When communication for public safety needs to be performed, the attach request message may contain a public safety indication for commanding communication for public safety. Alternatively, when group communication needs to be performed, the attach request message may contain a group communication indication for commanding group communication. When UE 1 first attaches to a network to perform public safety communication or group communication, it needs to be verified in the network whether it is suitable for performing public safety communication or group communication. To this end, the UE 1 needs to attach to the network with a secure value for the verification. The secure value needs to be a value that can be used for verification in the network in order to perform group communication or public safety communication.

The MME 116 is capable of transferring an authentication data request message to HSS 121 in operation 403. The HSS 121 is capable of transferring, to the MME 116, a response message containing security-related information, such as an authentication vector, etc.

When the MME 116 transfers, to UE 1, a user authentication request message containing an authentication token, AUTN, the UE 1 is capable of transferring, to the MME 116, a user authentication response message along with a response secure value (RES) in operation 405.

The MME 116 is capable of transferring an update location request message to the HSS 121 in operation 407. When communication for public safety needs to be performed, the MME 116 contains a public safety indication in the update location request message and transfers the message to the HSS 121. Alternatively, when group communication needs to be performed, the MME 116 contains a group communication indication in the update location request message and transfers the message to the HSS 121. When the UE 1 first attaches to a network, it needs to be verified in the network whether it is suitable for performing public safety communication or group communication. To this end, the UE1 needs to attach to the network with a secure value for the verification.

The secure value needs to be a value that can be used for verification in the network in order to perform group communication or public safety communication.

The HSS 121 inquires information regarding the UE 1, such as an identity (ID) for group communication, a group key, etc. in operation 409.

When the HSS 121 does not obtain inquired information in operation 409, it verifies whether the UE 1 is suitable for performing public safety communication or group communication, using the secret value (secure value) transferred from the UE 1, in operation 411.

When the HSS 121 ascertains that the UE 1 is suitable for performing public safety communication or group communication in operation 411, it assigns a group identity to the UE 1 and creates or assigns a group key to the UE 1 in operation 413. In an embodiment, a group identity is configured as follows. A group identity contains one of the following pieces of information regarding: a country, an area, and a communication network (service provider's network and intra-network). For public safety communication, the group identity may further contain public safety categories, e.g., fire service, public security, earthquake, typhoon, tsunami, tornado, etc.

The HSS 121 transfers subscription data to the MME 116 in operation 417. In order to provide ProSe, the HSS 121 may further transfer, to the MME 116, a ProSe identity, a ProSe group identity, a ProSe group key, a ProSe related capacity of UE, a proximity-related security key (ProSe key) if there are a registered ProSe identity and a security key, a ProSe Public Land Mobile Network (PLMN) list, etc. The proximity-related security key refers to a security key for proximity discovery or proximity communication. When the HSS 121 has had registration information regarding a proximity-related security key, it inquires the registration information and notifies the MME 116 of the information. On the other hand, when the HSS 121 has not had registration information regarding a proximity-related security key, it performs authentication and then generates the security key.

The MME 116 transfers an attach accept message to the eNB 114, and the eNB 114 transfers the received attach accept message to the UE 1 in operation 419. In operation 419, the MME 116 may also transfer, to the UE 1, the parameters which are transferred from the HSS 121 in operation 417, such as the ProSe identity, the ProSe related capacity of UE, the proximity-related security key, the ProSe group key, the ProSe group identity, the ProSe PLMN list, etc., along with the attach accept message.

In operations 401, 403, 405, 407, 409, 411, 413, 417, and 419, the MME 116 serves as an intermediate entity, or an intermediate node, and transfers a ProSe public indication, a secret value, etc., related to ProSe, to the HSS 121, so that the MME 116 participates in verification in the HSS 121. However, in another embodiment, an intermediate node is not implemented with the MME 116 but the Prose function 127 participating in intermediate processes, and transfers the parameters to the HSS 121 so that the MME 116 participates in verification of the HSS 121. That is, in operations 401, 403, 405, 407, 409, 411, 413, 417, and 419, an entity participating in the transmission of parameters may be the ProSe function 127. At least one of the following parameters for public safety: secret value, public safety indication, etc. may be transferred from the UE via the Prose function 127. The HSS 121 performs verification using the received parameters in operations 409, 411, and 413. When the ProSe function 127 serves as an entity in the intermediate processes, a Prose Group ID, a Prose Group Key, a Prose key, a Prose ID, etc., may be transferred from the HHS 121 to the UE via the Prose function 127 in operations 417 and 419.

After that, UE 1 transfers a ProSe registration request message to the ProSe function 127 in operation 423. Like the UE 1, UE 2, indicated by the reference number 131, performs a process for requesting ProSe registration in operation 423-2. The processes following operation 323-2 are described, referring to those of UE 1, assuming that UE 2 performs the same registration process as UE 1.

The ProSe function 127 transfers a ProSe registration request message to the HSS 121, and then the HSS 121 transfers a ProSe authentication vector to the ProSe function 127 in operation 425. The ProSe authentication vector contains a Cipher Key (CK) and an Integrity Key (IK).

The ProSe function 127 transfers, to the UE 1, a ProSe authentication token via a ProSe authentication request message in operation 427.

In another embodiment, the ProSe function 127 may transfer a Prose function ID, etc., to the HSS 121 in operation 425. In this case, the HSS 121 also transfers, to the Prose function 127, at least one of the following parameters: a ProSe group key, a ProSe key, a ProSe authentication token, etc. while transferring the ProSe authentication vector and the authentication token, in operation 425. The ProSe function 127 transfers, to the UE, at least one of the received parameters in operation 427.

UE 1 transfers, to the ProSe function 127, a ProSe authentication response message containing a value responding to the authentication token that the ProSe function 127 transferred to the UE 1 in order to perform ProSe registration in operation 429.

The ProSe function 127 compares RES with XRES and performs verification in operation 431.

The ProSe function 127 transfers a ProSe registration response message to the UE 1 in operation 433.

After that, UE performs ProSe group communication using a ProSe key or Prose identity, a Prose Group Key, a Prose Group ID, etc., as follows.

When UE 1 needs to verify a request message for ProSe group communication, using a group key, it contains its ProSe group key in a ProSe registration complete message and transfers the message to the ProSe function 127 in operation 443. The ProSe function 127 registers the group key of the UE 1 therein, using the received information.

The ProSe function 127 transfers, to an application server 125, a ProSe key and/or a ProSe group key, and ProSe registration-related information when UE performs a registration process to the ProSe function 127 in operation 443-3. The application server 125 stores at least one of the following: ProSe key, ProSe Group Key, etc. therein in operation 443-5. After that, the UE 1 and the application server 125 communicate with each other, using at least one of the following: the ProSe key, ProSe identity, Prose Group ID, Prose Group key, etc. in operation 443-7.

Referring to FIG. 3b, the UE 1 transfers a paging message to the UE 2 in operation 447. The paging message may contain a group communication indication for commanding ProSe group communication in UE or a public safety communication indication for commanding communication for public safety in UE.

The UE 1 notifies the UE 2 that it needs to communicate with a ProSe group, and requests ProSe communication in operation 449. The ProSe communication request may be performed via broadcast, broadcast IP, multicast, multicast IP, etc. In this case, a ProSe group ID may be used to indicate a destination.

In order to prevent a replay attack, group related information regarding UE 1 is transferred along with: a time stamp (case 1), a nonce (case 2), or stamp and nonce which are concatenated with each other (case 3) in operation 449. The time stamp may employ: time of an application layer (case 4), time of a physical layer (case 5), i.e., a physical counter used in a physical layer, time used in system information block (SIB) 16 used in layer 2 (case 6), etc. Time obtained from a physical layer as in case 5 or 6 may be transferred via SIB of layer 2 as in case 6. The time information as in cases 5 and 6 is advantageous because there is less possibility of physical time delay. This information is transferred via one time hash function (case 7). This information is used to generate a Message Authentication Code (MAC) using keys shared by a transmitter and a receiver, e.g., a group key, etc., and authentication is performed as to whether it is transferred from the correct transmitter (case 8).

UE 2 decrypts group-related information, time stamp, nonce, etc., transferred in operation 449, using a ProSe group key, and then verifies whether UE 1 belongs to a Prose Group in operation 451.

UE 2 transfers a group communication response message to the UE 1 in operation 453. In another embodiment, transferring the group communication response message may also include a group join process. This process may not be required when operation 449 is performed via a broadcast method.

When UE 1 broadcasts or multicasts to members of the ProSe group and receives a response message from UE 2, the UE 1 is capable of verifying whether UE 2 belongs to the group (case 1). Alternatively, in another embodiment, UE 1 requests a network to verify whether UE 2 belongs to the group and receives the verification result from the network (case 2).

In case 2, as an example, where the UE 1 requests a network to verify whether UE 2 belongs to the group and receives the verification result from the network, the UE 1 performs the verification via operations 459 to 467.

The UE 1 transfers, to the Prose function 127, a verification request message containing information requesting whether UE 2 belongs to the group in operation 459. In an embodiment, the ProSe function 127 verifies whether UE 2 belongs to the ProSe group, via a ProSe group communication list related to UE 1, in operation 461 (case 2-1). The ProSe group communication list is a list of UE devices in the ProSe group, which can perform ProSe communication with the UE 1.

In another embodiment, the ProSe function 127 generates a ProSe group key and stores the ProSe group key therein in operation 461 (case 2-2).

The ProSe function 127 transfers, to the UE 1, a verification response message containing response information to the verification in operation 463. The ProSe function 127 may transfer, to the UE 1, a message only informing of verification success or failure.

The UE 1 transfers, to the UE 2, a verification response message or a group join response message informing of the verification result, in response to a ProSe group communication request in operation 465. The verification response message and group join response message may include a verification response as to whether UE 2 belongs to a ProSe group and UE 2 joins in a ProSe group, respectively.

UE 2 transfers, to the UE 1, a ProSe group communication request complete message in operation 467.

A session key for Prose Group communication, an encryption key, a decryption key, etc. are transferred as in the following operations 481 to 495.

UE 1 transfers, to the ProSe function 127, a message requesting a session key for Prose group communication (or a ProSe group communication session key request message) in operation 481.

The ProSe function 127 generates a ProSe group communication session key in operation 483.

The ProSe function 127 encrypts the ProSe group session key with a ProSe group key and transfers the encrypted key to the UE 1 in operation 485.

The UE 1 decrypts the ProSe group session key in operation 487.

The UE 1 transfers, to the ProSe function 127, a message requesting a security key, e.g., a ProSe group encryption message and an integrity key request message, in operation 489.

The ProSe function 127 generates a ProSe group communication integrity key and a ProSe group communication encryption key in operation 491.

The ProSe function 127 encrypts the ProSe group communication encryption key or the ProSe group communication integrity key with the ProSe group session key and transfers the encrypted result to the UE 1 in operation 493.

The UE 1 decrypts the ProSe group communication encryption key or the ProSe group communication integrity key with the ProSe group session key in operation 495.

After that, UE devices that belonged to the ProSe group, e.g., UE 1, UE 2, etc., safely perform Prose Group communication with each other in operation 499.

Figure 4:
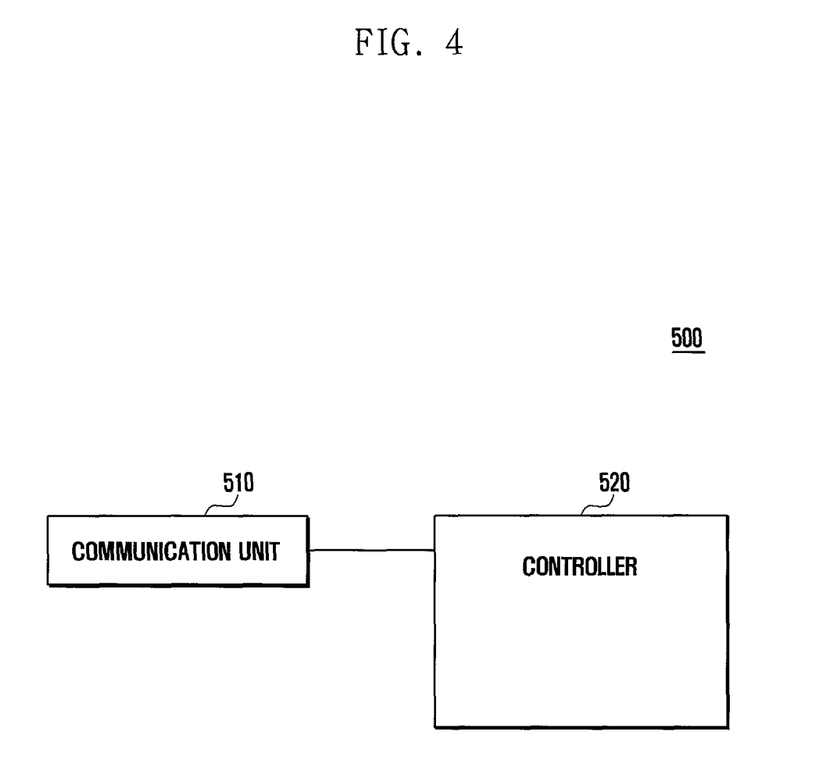
FIG. 4 is a diagram showing user equipment (UE) according to an embodiment of the present invention.

FIG. 4 is a diagram showing user equipment (UE) according to an embodiment of the present invention.

Referring to FIG. 4, the UE 500 is capable of including a communication unit 510 and a controller 520. The controller 520 controls UE to perform operations related to the embodiments described above. For example, the controller 520: transmits, to a Mobility Management Entity (MME), an attach request message containing a public safety indication and/or a group communication indication; receives, from the MME, an attach accept message containing at least one of the following: a ProSe identity, a ProSe group identity, a ProSe group key, a ProSe related capability of the UE 500, and a proximity related security key (ProSe key), to provide a proximity based service (Prose); transmits a ProSe registration request message to a ProSe function server; and receives a ProSe registration response message related to authentication of the UE 500 from the ProSe function server.

The controller 520 also: transmits, to second UE, a paging message containing a public safety indication and/or a group communication indication; transmits, to the second UE, a ProSe group communication request message containing ProSe group related information; receives, when the second UE verifies that the UE belonged to a ProSe group using the ProSe group related information, a ProSe communication response message from the second UE; verifies whether the second UE belongs to the ProSe group; and performs ProSe group communication with the second UE.

The communication unit 510 performs transmission/reception of signals when the embodiments are performed. The communication unit 510 performs communication with other entities. For example, the communication unit 510 transmits, to the MME, an attach request message containing a public safety indication and/or a group communication indication. The communication transmits a ProSe registration request message to the ProSe function server.

Figure 5:
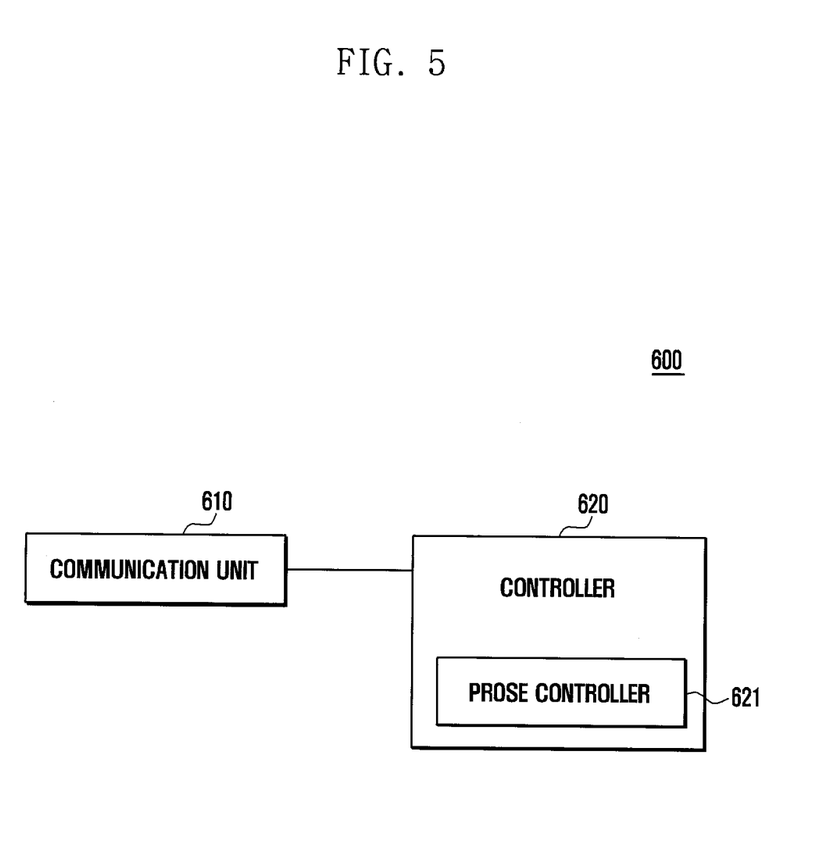
FIG. 5 is a block diagram showing a ProSe function server according to an embodiment of the present invention.

FIG. 5 is a block diagram showing a ProSe function server according to an embodiment of the present invention.

Referring to FIG. 5, the ProSe function server 600 is capable of including a communication unit 610 and a controller 620 for controlling operations of the ProSe function server 600. The controller 620 is capable of further including a ProSe controller 621.

The ProSe controller 621 controls the ProSe function server 600 to perform operations related to the embodiments described above. For example, the ProSe controller 621: performs a ProSe registration procedure for making a ProSe group communication with UE; receives a message requesting a ProSe group session key from the UE; generates the ProSe group session key; transmits the ProSe session key encrypted by a ProSe group key to the UE; receives, from the UE, a message requesting a ProSe group encryption key or integrity key; generates the ProSe group encryption key or integrity key; and transmits the ProSe group encryption key or integrity key, encrypted by the ProSe group session key, to the UE.

The communication unit 610 performs transmission/reception of signals related to operations in the embodiments described above. The communication unit 610 performs communication with other entities. For example, the communication unit 610 receives a message requesting a ProSe group session key from UE or transmits a ProSe group session key encrypted with a ProSe group key to the UE.

Figure 6:
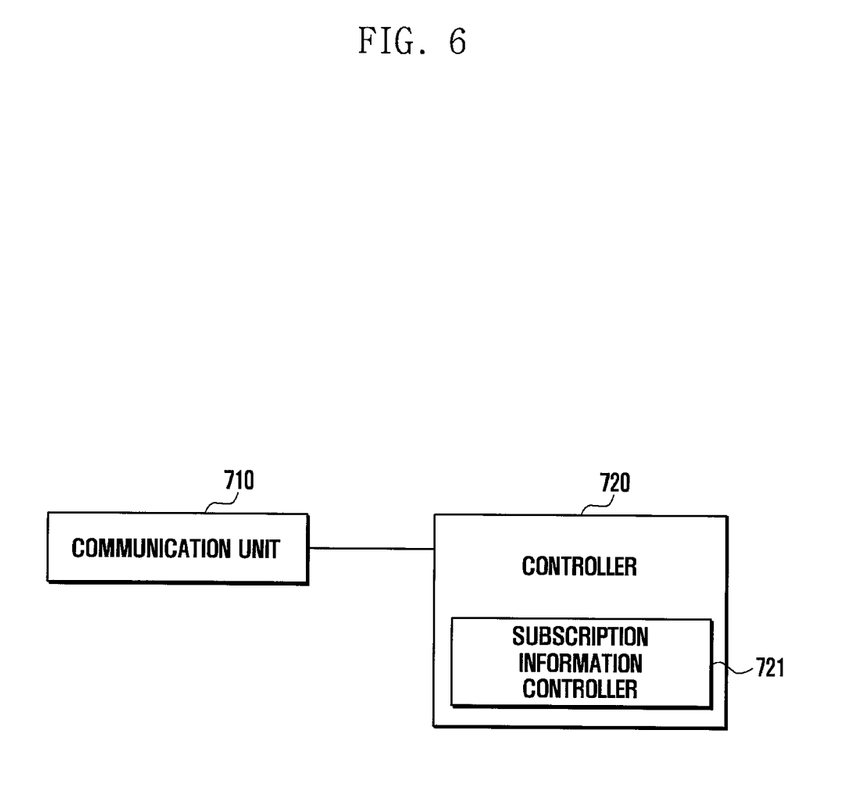
FIG. 6 is a block diagram showing an HSS according to an embodiment of the present invention.

FIG. 6 is a block diagram showing an HSS according to an embodiment of the present invention.

Referring to FIG. 6, the Home Subscriber Server (HSS) 700 is capable of including a communication unit 710 and a controller 720 for controlling operations of the HSS 700. The controller 720 is capable of further including a subscriber information controller 721.

The subscriber information controller 721 controls the HSS 700 to perform operations related to the embodiments described above. For example, the subscriber information controller 721 controls the HSS 700 to: receive an authentication data request message from an MME; and transmit, to the MME, security-related information containing an authentication vector, based on the received information.

The communication unit 710 performs transmission/reception of signals related to operations in the embodiments described above. The communication unit 710 performs communication with other entities. For example, the communication unit 710 receives an authentication data request message from an MME or transmits security-related information containing an authentication vector to the MME.

Figure 7:
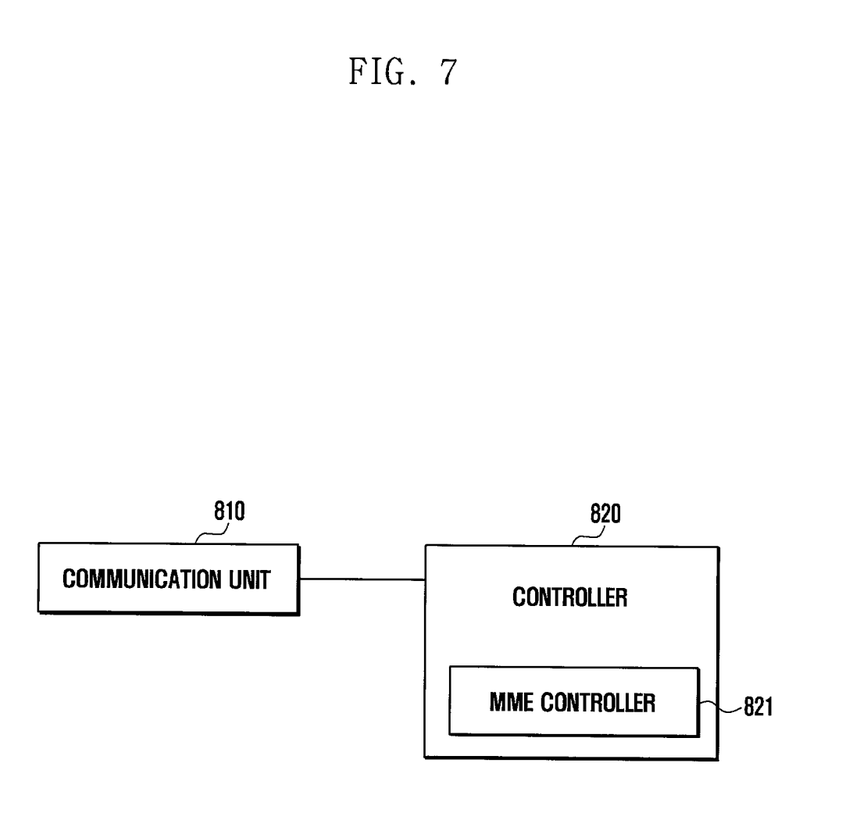
FIG. 7 is a block diagram showing an MME according to an embodiment of the present invention.

FIG. 7 is a block diagram showing an MME according to an embodiment of the present invention.

Referring to FIG. 7, the Mobility Management Entity (MME) 800 is capable of including a communication unit 810 and a controller 820 for controlling operations of the MME 800. The controller 820 is capable of further including an MME controller 821.

The MME controller 821 controls the MME 800 to perform operations related to the embodiments described above. For example, the MME controller 821 controls the MME 800 to: receive, from eNB, an attach request message transmitted by UE; and transfer, to an HSS, an authentication data request message based on the received attach request message. The MME controller 821 also controls the MME 800 to: receive, from the HSS, security-related information containing an authentication vector; and transfer, to the UE, a user authentication request message containing an authentication token, AUTN.

The communication unit 810 performs transmission/reception of signals related to operations in the embodiments described above. The communication unit 810 performs communication with other entities. For example, the communication unit 810 receives, from an eNB, an attach request message transmitted by UE, or transfers an authentication data request message to an HSS.

Although it is not described in detail, it should be understood that other network entities such as eNB, application server, etc. are capable of including a communication unit and a controller. The individual communication units perform transmission/reception of signals when entities communicate with each other. The individual controllers also control corresponding entities to perform operations related to the embodiments described above.

In the embodiments described above, operations and messages may be optionally or selectively processed or omitted. It should be understood that the operations described in the embodiments may be performed in a different order from the embodiments. It should also be understood that the messages described in the embodiments may be transferred in a different order from the embodiments.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The embodiments described in the present disclosure should not be analyzed as limitations but considered illustrative. The scope of the invention is defined in the appended claims, including the embodiments, alterations and modifications.

The invention claimed is:

1. A method for performing a proximity based service (ProSe) communication by a first terminal in a wireless communication system, the method comprising:
   transmitting, to a core network node, a first message including group related information;
   receiving, from the core network node, a second message in response to the first message, the second message including a ProSe group key and a ProSe group ID; and
   transmitting, to at least one second terminal, data associated with the ProSe group ID, based on the ProSe group key and the ProSe group ID.

2. The method of claim 1, wherein the transmitting comprises:
   transmitting, to a second terminal among the at least one second terminal, a paging message including at least one of a public safety indication and a group communication indication;
   transmitting, to the second terminal, a ProSe group communication request message including the ProSe group ID;
   when the second terminal verifies that the first terminal belongs to a ProSe group using the ProSe group ID, receiving a ProSe communication response message from the second terminal;
   verifying whether the second terminal belongs to the ProSe group; and
   performing a ProSe group communication with the second terminal.

3. The method of claim 2, wherein the performing the ProSe group communication with the second terminal comprises:
   transmitting a ProSe group session key request message to the core network node;
   receiving a ProSe session key encrypted by the ProSe group key from the core network node;
   transmitting a message requesting a ProSe group encryption key or an integrity key to the core network node; and
   receiving the ProSe group encryption key or the integrity key, encrypted by the ProSe session key, from the core network node.

4. The method of claim 1, wherein the first message includes a secret value used to verify whether the first terminal is suitable for group communication.

5. The method of claim 2, wherein the verifying comprises:
   transmitting, to the core network node, a verification request message inquiring whether the second terminal belongs to the ProSe group; and
   receiving, from the core network node, a verification response message in response to the verification request message.

6. The method of claim 1, further comprising:
   transmitting, to the core network node, a ProSe registration request message;
   receiving, from the core network node, a Prose registration response message related to an authentication of the first terminal; and
   transmitting, to the core network node, a ProSe registration complete message including the ProSe group key.

7. The method of claim 2, wherein the verifying comprises:
   transmitting, to the second terminal, a message notifying that verification of the second terminal belonging to the ProSe group is successful.

8. A first terminal for performing a proximity based service (ProSe) communication in a wireless communication system, the first terminal comprising:
   a transceiver; and
   a controller coupled with the transceiver and configured to control to:
   transmit, to a core network node, a first message including group related information,
   receive, from the core network node, a second message in response to the first message, the second message including a ProSe group key and a ProSe group ID, and
   transmit, to at least one second terminal, data associated with the ProSe group ID, based on the ProSe group key and the ProSe group ID.

9. The first terminal of claim 8, wherein the controller is further configured to:
   transmit, to a terminal among the at least one second terminal, a paging message including at least one of a public safety indication and a group communication indication,
   transmit, to the second terminal, a ProSe group communication request message including the ProSe group ID,
   receive, when the second terminal verifies that the first terminal belongs to a ProSe group using the ProSe group ID, a ProSe communication response message from the second terminal,
   verify whether the second terminal belongs to the ProSe group; and
   perform ProSe group communication with the second terminal.

10. The first terminal of claim 9, wherein the controller is further configured to:
    transmit a ProSe group session key request message to the core network node,
    receive a ProSe session key encrypted by the ProSe group key from the core network node,
    transmit a message requesting a ProSe group encryption key or an integrity key to the core network node, and
    receive the ProSe group encryption key or the integrity key, encrypted by the ProSe session key, from the core network node.

11. The first terminal of claim 8, wherein the first message includes a secret value used to verify whether the first terminal is suitable for group communication.

12. The first terminal of claim 9, wherein the controller is further configured to:
    transmit, to the core network node, a verification request message inquiring whether the second terminal belongs to the ProSe group, and
    receive, from the core network node, a verification response message in response to the verification request message.

13. The first terminal of claim 8, wherein the controller is further configured to:
    transmit, to the core network node, a ProSe registration request message,
    receive, from the core network node, a ProSe registration response message related to an authentication of the first terminal, and
    transmit a ProSe registration complete message including the ProSe group key to the core network node.

14. The first terminal of claim 9, wherein the controller is further configured to transmit, to the second terminal, a message notifying that verification of the second terminal belonging to the ProSe group is successful.

* * * * *